United States Patent [19]

Shinkle

[11] Patent Number: 4,474,265

[45] Date of Patent: Oct. 2, 1984

[54] TREE CHAIR

[76] Inventor: Galen F. Shinkle, 181 S. Marion Cir., Ringgold, Ga. 30736

[21] Appl. No.: 569,181

[22] Filed: Jan. 9, 1984

[51] Int. Cl.³ .................. A01M 31/02; A45F 3/26; A47C 9/10
[52] U.S. Cl. .................. 182/187; 108/152; 297/457
[58] Field of Search .............. 182/187, 188; 108/152; 297/457, 441

[56] References Cited

U.S. PATENT DOCUMENTS

| | | | |
|---|---|---|---|
| 2,712,349 | 7/1955 | Le Voir | 297/457 |
| 2,847,059 | 8/1958 | Klins | 182/187 |
| 2,851,085 | 9/1958 | Woodward | 182/187 |
| 3,065,821 | 11/1962 | Hundley | 182/187 |
| 3,261,425 | 7/1966 | Harder | 182/187 |
| 3,340,828 | 9/1967 | Smith | 182/187 |
| 3,513,940 | 5/1970 | Ussery | 182/187 |
| 3,730,294 | 5/1973 | Thurmond | 182/187 |
| 3,871,482 | 3/1975 | Southard | 182/187 |
| 4,315,655 | 2/1982 | Machnik | 182/187 |
| 4,337,844 | 7/1982 | Hice | 182/187 |

Primary Examiner—Reinaldo P. Machado
Attorney, Agent, or Firm—Alan Ruderman

[57] ABSTRACT

A collapsible chair for use by a hunter at an elevational disposition in a tree has a substantially U-shaped frame, a length of padding secured at one end to the cross member and adjustable securing ties and belting to attach the frame and free end of the padding to the tree. When not in use the padding may be folded or rolled about the cross member and tied thereto and the frame may be readily carried.

15 Claims, 4 Drawing Figures

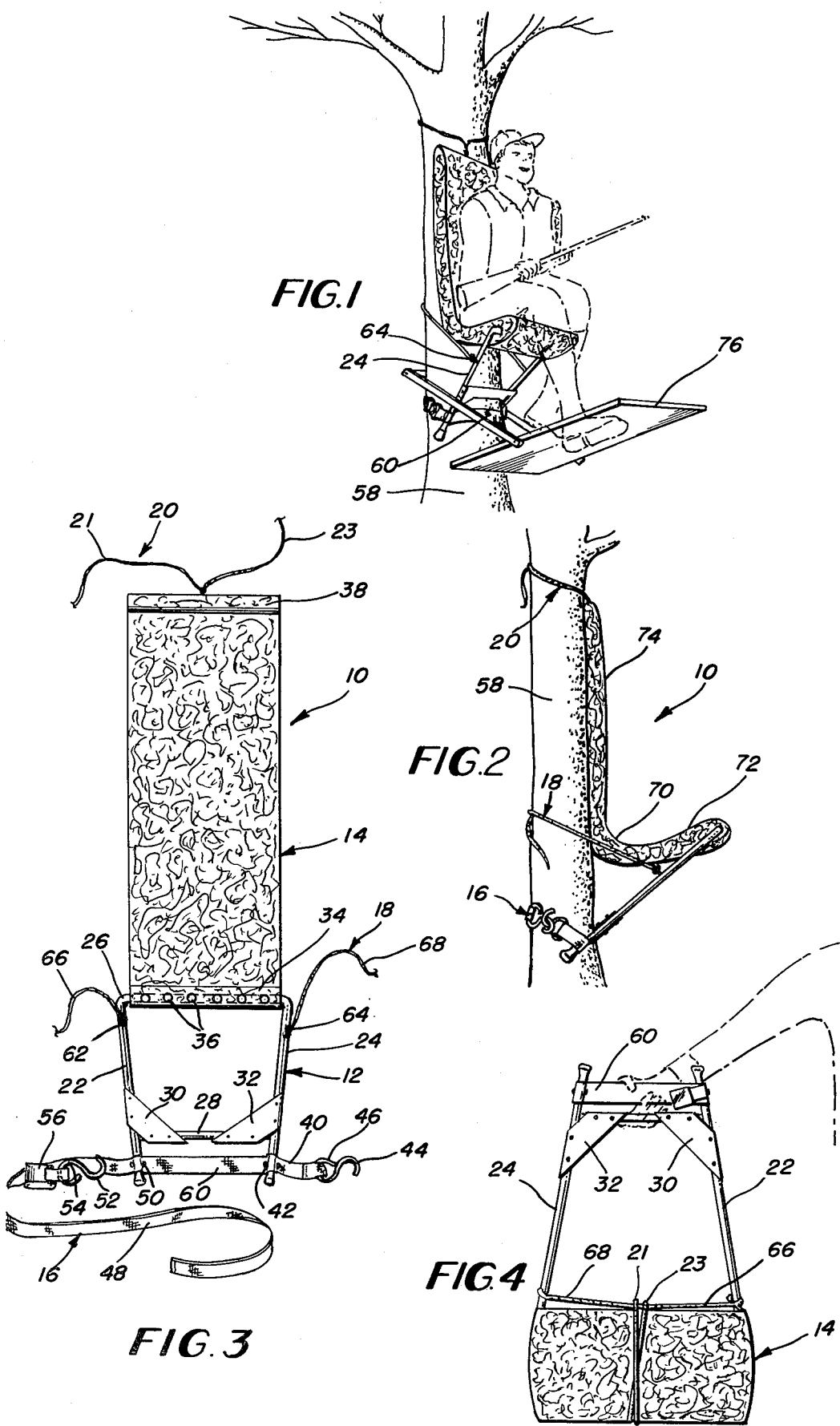

TREE CHAIR

BACKGROUND OF THE INVENTION

This invention relates to a sportsmen's chair and more particularly to a chair which may be securely mounted in a tree or the like for use by hunters and which is foldably collapsible so as to be carried to and from a hunting site.

When hunting deer and certain other game, it may be necessary for a sportsman to be in an elevated position such as in a tree to preclude the game from readily picking up the scent of the hunter. In such instances a hunter may have to remain in such a location for a substantial period of time. It is not uncommon for one to patiently remain in the tree for twelve or more hours. Obviously remaining so perched for such periods of time can be uncomfortable, and although hunters may be a hardy breed and thrive on challenge, it is desirable to make some provision for reducing the discomfort associated with the sport. The prior art however does not seem to have addressed this problem or to have adequately provided a solution thereto.

SUMMARY OF THE INVENTION

Consequently, it is a primary object of the present invention to provide apparatus which can be mounted in an elevated position in a tree or the like and secured thereto for supporting a sportsman while he awaits the approach of the game.

It is another object of the present invention to provide a seat which is readily attachable to a tree or the like at a hunting site for comfortably supporting a hunter and which may be foldably collapsed so as to be readily carried to and from the site.

It is a further object of the present invention to provide a collapsible seating apparatus which can be secured to a tree or the like at an elevational disposition to form a chair for comfortably supporting a hunting enthusiast while he awaits his prey and which can be foldably collapsed against the tree when the hunter stands and for carrying, the apparatus having a frame and securing means adapted to securely grasp the trunk of the tree and a seating and back supporting pad carried by the frame and securable to the tree above the frame.

Accordingly, the present invention provides collapsible seating apparatus for use by a hunting sportsman which permits the sportsman to perch in an elevated portion of the tree while he awaits the approach of the hunted game. The apparatus includes a frame having a pair of spaced apart legs adapted to engage the trunk of the tree at opposite dispositions in straddling fashion, a spanning member connected between the legs at locations adjacent to but spaced from the ends of the legs for abutting the tree, a cross member extending between the legs spaced remotely from the ends, adjustable fastening means for securing the legs about the tree, a length of pad secured at one end to the cross member, and adjustable connecting means at the other end of the pad for attaching about the tree trunk at selected locations above the legs for providing a seat and back support for the sportsman. In the preferred form of the invention the cross member and the legs are formed from a single tubular member, the adjustable fastening means includes adjustable strapping, and the adjustable connecting means comprises rope means. Additional rope means is connected to the legs intermediate the fastening means and the cross member for connecting about the tree for varying the angular disposition of the legs. Thus, the seating portion of the pad may be angularly adjusted by means of the disposition of both rope means. When not in use the padding may be folded or coiled about the cross member and tied in place by the rope means connected to the legs.

BRIEF DESCRIPTION OF THE DRAWINGS

The particular features and advantages of the invention as well as other objects will become apparent from the following description taken in connection with the accompanying drawings, in which:

FIG. 1 is a front perspective view of a collapsible tree chair constructed in accordance with the principles of the present invention, the chair being illustrated in the operative position in an elevated portion of a tree and depicting an occupant seated therein;

FIG. 2 is a side elevational view of the chair illustrated in FIG. 1;

FIG. 3 is a developed plan view thereof with the frame and pad fully extended; and FIG. 4 is an elevational view of the chair being carried in the folded collapsed position.

DESCRIPTION OF THE PREFERRED EMBODIMENT

Referring to the drawings, collapsible seating apparatus for supporting a sportsman at an elevated location such as in a tree is illustrated at 10. For convenience of description the apparatus will hereinafter be designated as a "tree chair" but it should be understood that the apparatus can be used as a seat and upper body support on any vertically extending structure having the general configuration of a tree. Basically the tree chair 10 comprises a frame 12, a support pad 14 and adjustable means such as strapping 16 and ties 18 and 20 for securing the tree chair to the tree.

The frame 12 includes a substantially U-shaped structure having a pair of spaced apart legs 22, 24 interconnected by a cross bar 26, the legs 22, 24 and cross bar 26 preferably being formed from a unitary tubular metal material such as aluminum and bent into the desired shape. As illustrated the legs 22, 24 preferably may be tapered slightly toward each other. Another tubular member 28, which acts as a brace, extends between and is connected to the legs 22, 24 by bolts, rivets or the like at a location spaced from the free ends of the legs. Gusset plates 30, 32 are fastened to the brace 28 and to the respective legs 22, 24 remote from the free ends for providing rigidity to the frame.

The padding 14 is of a substantially elongated rectangular shape having one of the shorter ends fastened to the cross bar 26, that end of the frame being rolled or folded at 34 about the cross bar 22 and secured thereto by passing the screws or the like 36 through the padding and into the bar 22. However, it is to be understood that any other convenient means of fastening the padding may be utilized such as stitching sewn through and locking the plys of padding about the cross bar. The other end of the pad preferably is folded or encircled about a tube or rod such as at 38 and has the central portion of the tie 20 secured thereto, the ends of the tie 20 being free. Alternatively the tie 20 which preferably is natural or synthetic rope, cable or other cordage may comprise two separate strands 21, 23 each secured at one end to the portion 38 of the pad 14. The section of the pad 14 intermediate the portions 34, 38 acts as a cushion for supporting the user and may comprise a pair of spaced plys of fabric or plastic material connected about the periphery and filled with a comfortable flexible stuffing material such as that used for filling lawn chairs or furniture cushions and the like, e.g., natural or synthetic materials such as plastic foam, kapok etc.

Secured to the legs 22, 24 of the frame adjacent the free ends thereof is the adjustable strapping 16 which preferably is a fabric web belt similar to that used for automotive seat belts. As best illustrated in FIG. 3, the belting 16 includes one strip 40 secured to the leg 24 as by bolts 42 or the like. The strip 40 has a hook formation 44 or the like fastened at the free end thereof as by looping the end of the strip about an eyelet 46 formed on the member having the hook formation, the looped about portion of the belt being stitched to the remainder of the belt. The belt 16 includes a second strip 48 connected to the other leg 22 by means of bolts 50 or the like and has a second hook formation 52 connected thereto intermediate the portion secured to the leg 22 and the free end. The connection of the hook formation to the belt 48 is a loose adjustable connection formed merely by looping the belt through an eyelet 54 formed on the member having the hook formation, i.e., the belt passes freely through the eyelet 54. Furthermore, intermediate the hook 52 and the free end of the belting 48 there is included a friction type web gripping and securing buckle 56 similar to that used with automotive seat belts, the belt 48 being wound about the clamping member as is well known in the art. Thus, as illustrated in FIG. 2, the belting may be positioned about a tree 58, the hooks 44 and 52 interlocked, and the free end portion of the belt 48 pulled to shorten the portion of the belt between the hook and the buckle 56 and thereby tighten the belting about the tree. For reasons hereinafter made clear the belting 16 preferably comprises a single web having sections 40 and 48 which extends at 60 to span the frame between the legs 22 and 24, or the portion 60 may be an additional strip of belting itself fastened to the legs 22, 24.

Secured to or formed on each of the legs 22, 24 adjacent the cross bar 26 is a respective eyelet 62, 64, each eyelet having a respective strand 66, 68 of the tie 18 secured thereto, the tie 18 being natural but preferably synthetic rope, cable or other cordage and the strands being connected by a knot to the respective eyelet. The free ends of the strands 66, 68 in use may be connected together about the tree or may be connected to other rope or the like by slip knots such as a Chinese knot and the latter rope may then be connected about the tree.

In operation, the free ends of the legs 22, 24 are disposed about and securely engage the trunk of the tree 58, the hooks 44 and 52 interlocked and the belt tightened as heretofore described. The portion 60 of the belt is thus tightly stretched across the trunk of the tree so that the frame 12 is tightly secured thereto. The strands of the tie 18 are disposed about the tree trunk above the belting 16 and connected together as by knotting, the position of the tie 18 above the belting 16 being determinative of the angle that the frame 12 makes relative to the tree trunk. The strands of the tie 20 are then looped about the tree trunk and knotted together at a disposition so that the pad 14 is folded as at 70 to form a seat 72 and a back support 74. The location of the ties 18 and 20 may be adjusted so that the seat 72 and back 74 are at an angle and are of a size to best fit the needs and comfort of the user. Preferably the apparatus is positioned slightly above a tree stand 76 which is secured to the tree so that the hunter may rest his feet on the tree stand platform safely.

When dismount from the tree is desired, the ties 18, 20 are disconnected from the tree, the buckle 56 is released and the hooks are disconnected. The pad 14 may be folded upon itself as illustrated in FIG. 4 and the ties may be used to secure the pad in the folded position. The apparatus may then be readily carried by grasping the belt portion 60 and/or the brace 28, or the apparatus may be carried on a back pack. When stretched out it may also be used as a mattress pad and used for sleeping on the ground. However, it functions primarily as a comfortable seat in the tree and may also be used at the bottom of the tree and when so used folded against the tree for a comfortable back support.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Collapsible seating apparatus for use by a sportsman adapted to be disposed in an elevated portion of a tree or the like, said apparatus comprising, a frame having a pair of legs spaced apart at a first pair of respective ends for straddling the trunk of the tree, a cross member extending between and connecting said legs together at the other respective ends for maintaining the legs in spaced apart relationship, a spanning member spaced from said cross member extending between said legs adjacent said first pair of ends, an elongated flexible pad of cushioning material having one edge thereof fastened to said cross member and extending freely toward a second edge spaced therefrom, adjustable belting means for selectively extending between and interconnecting said legs adjacent said first ends and adapted to wrap about and encircle the tree to secure said legs tightly to said tree and for abuttingly engaging said spanning member with said tree, and adjustable tying means secured to said second edge of said pad and adapted to be tied about the tree above said belting means, whereby said pad extends to form a seat and back support.

2. A collapsible seating apparatus as recited in claim 1, including additional adjustable tying means fastened to each leg intermediate said ends and said cross member and adapted to encircle said tree intermediate said belting and the first mentioned tying means for selectively varying the angular disposition of said legs relatively to said tree.

3. A collapsible seating apparatus as recited in claim 2, wherein said adjustable belting means includes first latch means fixedly fastened to one leg and second latch means adjustably fastened to the other leg and adapted to grasp and hold said first latch means selectively, and means for varying the location of said second latch means.

4. Collapsible seating apparatus as recited in claim 3, wherein said means for varying the location of said second latch means comprises a belt securing buckle for frictionally grasping said belting.

5. Collapsible seating apparatus as recited in claim 4, wherein said belting means comprises a fabric webbing.

6. Collapsible seating apparatus as recited in claim 5, wherein said belting means comprises a first strand of webbing secured to said one leg and carrying said first latch means, and a second strand of webbing secured to said other leg and carrying said second latch means, said second latch means being moveable along said second strand of webbing as permitted by said buckle.

7. Collapsible seating apparatus as recited in claim 2. wherein said tying means comprises cordage.

8. Collapsible seating apparatus as recited in claim 2, wherein said legs and said cross member comprise a unitary tubular member bent into a substantially U-shaped configuration.

9. Collapsible seating apparatus as recited in claim 8, wherein said adjustable belting means includes first latch means fixedly fastened to one leg and second latch means adjustably fastened to one leg and second latch means adjustably fastened to the other leg and adapted to grasp and hold said first latch means selectively, and means for varying the location of said second latch means.

10. Collapsible seating apparatus as recited in claim 9, wherein said means for varying the location of said second latch means comprises a belt securing buckle for frictionally grasping said belting.

11. Collapsible seating apparatus as recited in claim 10, wherein said belting means comprises a fabric webbing.

12. Collapsible seating apparatus as recited in claim 11, wherein said belting means comprises a first strand of webbing secured to said one leg and carrying said first latch means, and a second strand of webbing secured to said other leg and carrying said second latch means, said second latch means being moveable along said second strand of webbing as permitted by said buckle.

13. Collapsible seating apparatus as recited in claim 12, wherein said tying means comprises cordage.

14. Collapsible seating apparatus as recited in claim 13, wherein each of said latch means comprises a hook shaped member.

15. Collapsible seating apparatus as recited in claim 8, wherein said legs taper slightly toward each other from the cross member toward the ends.

* * * * *